(12) United States Patent
Christianson

(10) Patent No.: US 8,413,342 B2
(45) Date of Patent: Apr. 9, 2013

(54) LEVEL WITH A MAGNET-MOUNTING STRUCTURE

(75) Inventor: John Christianson, Waukesha, WI (US)

(73) Assignee: Empire Level Mfg. Corp., Mukwonago, WI (US)

( * ) Notice: Subject to any disclaimer, the term of this patent is extended or adjusted under 35 U.S.C. 154(b) by 216 days.

(21) Appl. No.: 13/039,486

(22) Filed: Mar. 3, 2011

(65) Prior Publication Data

US 2012/0222321 A1 Sep. 6, 2012

(51) Int. Cl.
*G01C 9/00* (2006.01)
(52) U.S. Cl.
USPC .............................. 33/347; 33/451; 33/DIG. 1
(58) Field of Classification Search .................. 33/347, 33/451, DIG. 1, 758
See application file for complete search history.

(56) References Cited

U.S. PATENT DOCUMENTS

| | | | |
|---|---|---|---|
| 2,535,791 A * | 12/1950 | Fluke | 33/347 |
| 3,036,791 A | 5/1962 | Siggelkow | |
| 3,046,672 A | 7/1962 | Lace | |
| 3,100,937 A * | 8/1963 | Burch | 33/770 |
| 3,180,036 A | 4/1965 | Meeks, Sr. | |
| 3,187,437 A | 6/1965 | Ellis | |
| 4,125,944 A | 11/1978 | Esposito et al. | |
| 5,755,037 A | 5/1998 | Stevens | |
| 6,792,686 B2 * | 9/2004 | Krehel et al. | 33/382 |
| 6,935,035 B2 * | 8/2005 | Smith | 33/391 |
| 7,028,413 B2 * | 4/2006 | Filipescu | 33/528 |
| 7,089,676 B2 | 8/2006 | Godinez | |
| 7,278,218 B2 | 10/2007 | Levine | |
| 7,316,074 B2 * | 1/2008 | Tran et al. | 33/451 |
| 7,363,719 B2 | 4/2008 | Levinson et al. | |
| 7,398,600 B2 | 7/2008 | Ming | |
| 7,406,773 B2 | 8/2008 | Helda | |
| 7,467,475 B1 * | 12/2008 | Cheek | 33/379 |
| 7,472,487 B2 * | 1/2009 | Tran et al. | 33/379 |
| 7,552,540 B2 | 6/2009 | Ming | |
| 7,565,749 B2 | 7/2009 | Helda | |
| 7,802,371 B2 * | 9/2010 | Ming | 33/347 |
| 2006/0196061 A1 | 9/2006 | Nichols | |
| 2006/0283031 A1 | 12/2006 | Ming | |
| 2007/0234581 A1 | 10/2007 | Ming | |

FOREIGN PATENT DOCUMENTS

| | | |
|---|---|---|
| EP | 0126844 A2 | 12/1984 |
| GB | 1529608 | 9/1976 |
| GB | 2436432 A | 9/2007 |
| JP | 11173843 A | 7/1999 |
| JP | 11183170 A | 7/1999 |

* cited by examiner

*Primary Examiner* — Christopher Fulton
(74) *Attorney, Agent, or Firm* — Jansson Shupe & Munger Ltd.

(57) ABSTRACT

A levels of the type including an elongate hollow frame and a magnet secured to the frame having a magnet-mounting structure which includes first and second magnet-holding members positioning the magnet with respect to a bottom-wall opening. The first magnet-holding member has a first side flange; and the second magnet-holding member has a second side flange. Each side flange is positioned to extend along one of opposite frame sidewalls at an inner surface of a frame bottom wall. A locking member pulls the magnet-holding members together such that the side flanges are locked inside the level frame along the opposite sidewalls, thereby mechanically securing the magnet to the level frame.

20 Claims, 2 Drawing Sheets

LEVEL WITH A MAGNET-MOUNTING STRUCTURE

FIELD OF THE INVENTION

This invention relates to levels and, more particularly, to structures for reliably securing magnets to levels.

BACKGROUND OF THE INVENTION

In the construction industry, levels are used to ensure that structural members are installed in their exact intended orientations. Levels include plural vials normally secured to the level frame for ascertaining the orientation of substantially horizontal, vertical or angled surfaces. In certain jobs, work pieces are metallic such as metal beams or pipes. Aluminum levels easily slip off the metal such metal surfaces making it difficult to perform necessary measurements and ascertain the exact orientation of the work pieces. For these jobs, it is best to use levels with magnets in the measuring surface for attraction of the level to the work piece. Magnets built into the level measuring surface significantly reduce slippage of the level off the work surface.

Heavy-duty levels, of course, require magnets of significant strength with strong magnetic attraction to the work piece. On the other hand, such strong magnetic attraction requires application of a large force for pulling the level away from the work piece. Such strong magnetic attraction and oppositely-directed pulling force exert a substantial strain on the connection between the magnet and the level frame. As a result, many prior magnet-level connections weaken and, eventually, magnets detach from level frame making such level inoperable for use on metal work pieces and overall shortening life of the level.

Another significant factor effecting the life of magnet connection to level frame are various impacts caused by the occasional dropping of the level or other disruptive occurrences at a construction site.

There have been various prior arrangements for mounting magnets to level frame. Such arrangements, however, have problems and disadvantages rendering them problematic in many situations. Certain devices of the prior art are disadvantageous in requiring use of adhesives which age and change their characteristics due to such factors as exposure to very high or very low temperatures. Such connections become disassembled after a much shorter periods of time then the intended life of the level.

There is a need for an improved level which overcomes the aforementioned problems. It would be desirable to have a level with a magnet which is reliably secured to the level body without reliance on adhesives. It would be advantageous to have a magnet secured to a level in a way which sustains repetitive stress of pulling the level against magnetic force and would remain intact despite dropping and other accidental impacts.

OBJECTS OF THE INVENTION

It is an object of the invention to provide an improved level with a magnet-mounting structure which overcomes some of the problems and shortcomings of the prior art, including those referred to above.

Another object of this invention is to provide a magnet-mounting structure which provides secure holding of a magnet to the level frame.

Another object of the invention is to provide a magnet-mounting structure which facilitates easy assembly of a level.

Yet another object of the invention is to provide a magnet-mounting structure which does not rely on adhesive for magnet securement to the level.

Yet another object of the invention is to provide a magnet-mounting structure which sustains repetitive stress of pulling the level against magnetic force.

Another object of the invention is to provide a magnet-mounting structure which would remain intact despite dropping and other accidental impacts.

Still another object of the invention is to provide a method for securing a vial mounting structure to a level.

How these and other objects are accomplished will become apparent from the following descriptions and the drawings.

SUMMARY OF THE INVENTION

This invention, which will be described in detail below, is an improvement in levels of the type including an elongate hollow frame and a magnet secured to the frame. The frame has two opposite sidewalls and top and bottom walls extending between the sidewalls, the bottom wall defining an opening into the frame interior. The magnet is secured at the bottom-wall opening.

The inventive level has a magnet-mounting structure which includes first and second magnet-holding members positioning the magnet with respect to the bottom-wall opening. The first and second magnet-holding members may be made of plastic or other suitable material. The first magnet-holding member has a first side flange; and the second magnet-holding member has a second side flange. Each side flange is positioned to extend along one of the opposite sidewalls at an inner surface of the bottom wall. A locking member pulls the magnet-holding members together such that the side flanges are locked inside the level frame along the opposite sidewalls, thereby mechanically securing the magnet to the level frame. While, the magnet-mounting structure securely holds the magnet within the level frame, some epoxy may be used to eliminate any movement of the magnet in the magnet-mounting structure and thereby prevent rattling of the magnet inside the frame. However, such epoxy application is purely esthetical and is not necessary for securement of the magnet to the level frame when the inventive magnet-mounting structure is utilized.

In certain preferred embodiments, the frame includes an inner-wall extending between the sidewalls substantially parallel thereto and terminating with a magnet-holding edge at the bottom-wall opening. The first magnet-holding member is preferably positioned against the magnet-holding edge of the frame inner-wall.

In such embodiments, the first magnet-holding member has top and bottom surfaces. It is preferred that the top surface have a notch receiving the magnet-holding edge of the frame inner wall, thereby retaining the magnet-mounting structure in substantially fixed side-to-side position. The notch is preferably formed by a pair of protrusions extending from the top surface of the first magnet-holding member.

The magnet-holding edge of the frame inner wall preferably includes lateral edge portions adjoining the bottom wall. The lateral edge portions retain the first magnet-holding members in substantially fixed lengthwise position.

In some embodiments, the first magnet-holding member defines a magnet-receiving opening configured to receive the magnet such that the magnet is positioned against the magnet-holding edge of the inner wall. The first magnet-holding member is preferably positioned against the magnet-holding edges of the frame inner-wall.

In preferred embodiments, the locking member includes a fastener extending through an aperture in the second magnet-holding member and engaging the first magnet-holding member. The fastener is preferably a threaded fastener in threaded engagement with the first magnet-holding member such that tightening of the fastener pulls the magnet-holding members together. The locking member may include a pair of the fasteners. In some such embodiments, the locking member includes two pairs of the fasteners, one at each end of the magnet-holding members.

Another aspect of this invention is a method for securing a magnet to the level. In the inventive method a magnet-mounting structure is provided. The magnet-mounting structure includes first and second magnet-holding members having respective first and second side flanges. The first magnet-holding member is inserted into the bottom-wall opening such that the first side flange extends along the first sidewall at an inner surface of the bottom wall. The magnet is positioned in the level interior at the first magnet-holding member. The second magnet-holding member is placed over the magnet such that the second side flange extends along the second sidewall at the inner surface of the bottom wall, the first and second side flanges being on opposite sides of the magnet-mounting structure. The magnet-holding members are mechanically secured together such that the side flanges are held inside the level frame thereby securing the magnet in position with respect to the bottom-wall opening.

In the embodiments where the frame includes the inner-wall extending between the sidewalls substantially parallel thereto and terminating with a magnet-holding edge at the bottom-wall opening, in the inserting step the first magnet-holding member is positioned against the magnet-holding edge of the frame inner-wall.

In preferred embodiments, the magnet mounting structure includes a locking member which has a fastener configured for extending through an aperture in the second magnet-holding member for engagement with the first magnet-holding member. In such embodiments, the securing step is pulling the magnet-holding members together by tightening the fastener. The fastener is preferably a threaded fastener for threaded engagement with the first magnet-holding member. In the securing step, the fastener is inserted through an aperture of the second magnet-holding member and engaged with the first magnet-holding member. The fastener is tightened against the second magnet-holding member such that the magnet-holding members are pulled together. In some embodiments, the locking member includes a pair of the fasteners. The locking member may include two pairs of the fasteners, one at each end of the magnet-holding members.

The inventive magnet-mounting structure permits placement of magnets at any position along the length of the level frame, including in the middle under a central vial positioned at the top wall or along hand holes. Such flexibility in magnet placement had not been available prior to the present inventive magnet-installation method utilizing the inventive magnet-mounting structure which is compactly located at the bottom wall and is preferably fee of engagement with the top wall. This allows magnet positioning in places previously unacceptable for magnets due to intervening structures such as hand holes or vial(s).

DETAILED DESCRIPTION OF PREFERRED EMBODIMENTS

Figure 1:
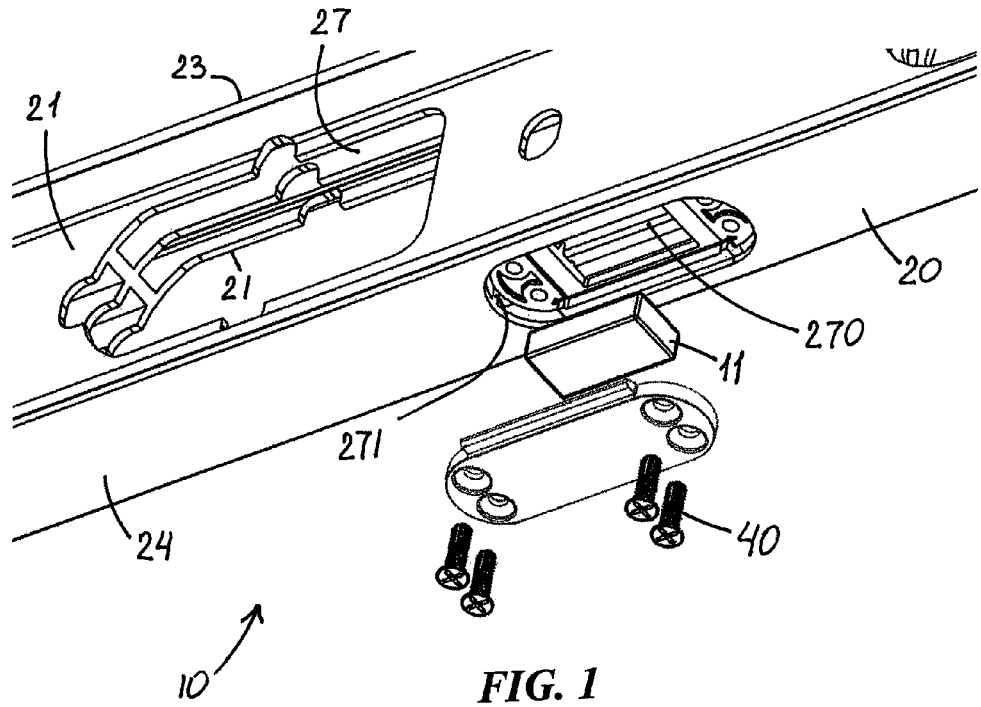
FIG. 1 is a fragmentary exploded perspective view of a level in accordance with this invention.

The drawings show a level 10 that includes an elongate hollow frame 20 and a magnet 11 secured to frame 20. Frame 20 has two opposite sidewalls 21, a top wall 23 and a bottom wall 24 extending between sidewalls 21. Bottom wall 24 defines an opening 25 into frame interior 26. Magnet 11 is secured at bottom-wall opening 25.

Figure 2:
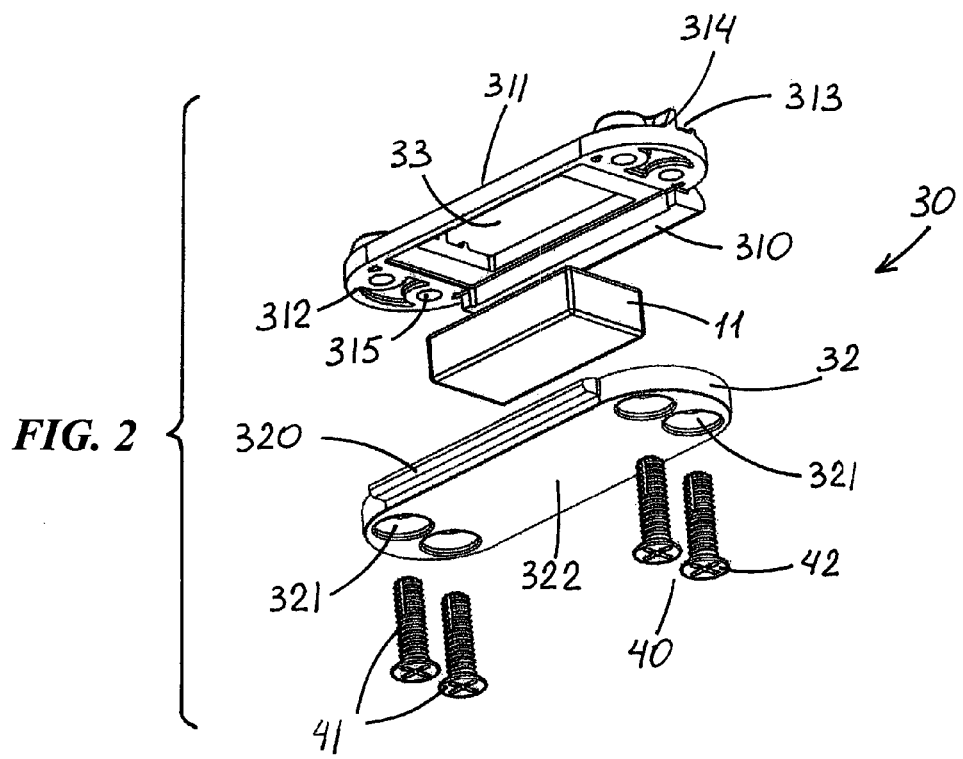
FIG. 2 is an exploded perspective view of the magnet-mounting structure of FIG. 1.
Figure 3:
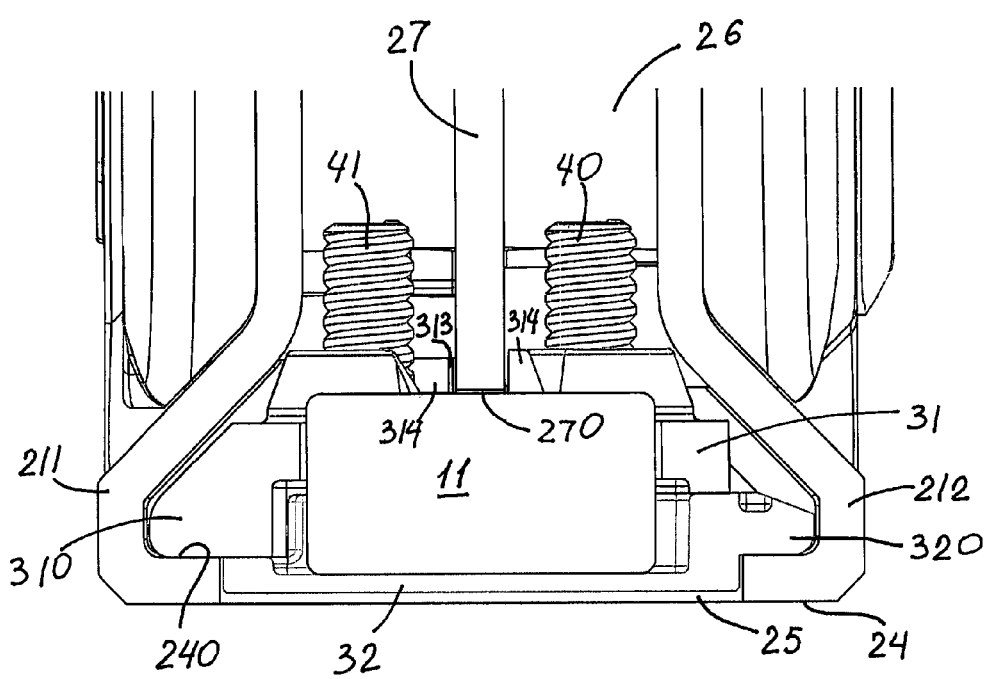
FIG. 3 is a cross-sectional view of the assembled magnet-mounting structure of FIG. 1.

It is best seen in FIGS. 1 and 2 that level 10 has a magnet-mounting structure 30 which includes a first magnet-holding member 31 and a second magnet-holding member 32. FIG. 3 illustrates that magnet-holding members 31 and 32 together position and hold magnet 11 with respect to bottom-wall opening 25. FIG. 2 best shows that first magnet-holding member 31 has a first side flange 310 positioned to extend along one of opposite sidewalls 21 at an inner surface 240 of bottom wall 24; and second magnet-holding member 32 has a second side flange 320 positioned to extend along the other one of opposite sidewalls 21 at inner surface 240 of bottom wall 24. A locking member 40 pulls magnet-holding members 31 and 32 together such that side flanges 310 and 320 are locked inside level frame 20 along opposite sidewalls 21, thereby mechanically securing magnet 11 to level frame 20.

FIGS. 1 and 3 show a preferred embodiment with frame 20 including an inner-wall 27 extending between sidewalls 21 substantially parallel thereto and terminating with a magnet-holding edge 270 at bottom-wall opening 25. As seen in FIG. 1, first magnet-holding member 31 is positioned against magnet-holding edge 270 of frame inner-wall 27.

First magnet-holding member 31 has a top surface 311 and a bottom surface 312. As best seen in FIG. 2, top surface 311 has a notch 313 which receives magnet-holding edge 270 of frame inner wall 27. By such engagement, first magnet-holding member 31 retains magnet-mounting structure 30 in substantially fixed side-to-side position. As further seen in FIG. 2, notch 313 is formed by a pair of protrusions 314 extending from top surface 311 of first magnet-holding member 31.

FIG. 1 also shows that magnet-holding edge 270 of frame inner wall 27 includes lateral edge portions 271 adjoining bottom wall 24. As illustrated in FIG. 1, lateral edge portions 271 retain first and second magnet-holding members 31 and 32 in substantially fixed lengthwise position.

First magnet-holding member 31 further defines a magnet-receiving opening 33 configured to receive magnet 11 such that magnet 11 is positioned against magnet-holding edge 270 of inner wall 27. FIG. 1 shows first magnet-holding member 31 positioned against magnet-holding edges 270 of frame inner-wall 27.

Alternatively, the first magnet-holding member may have a closed upper wall which is positioned against magnet-holding edge 270, if one is present. In such embodiments, the magnet is positioned against the closed wall of the first magnet-holding member and is sandwiched between the first and second magnet-holding members. The magnet-mounting structure of this type may rest on the frame inner or be secured to a frame without the inner wall in an alternative way.

Locking member 40 is shown to include a fastener 41 extending through an aperture 321 in second magnet-holding member 32 and engaging first magnet-holding member 31. Fastener 41 is preferably a threaded fastener in threaded engagement with first magnet-holding member 31 such that tightening of fastener 41 pulls magnet-holding members 31 and 32 together. FIGS. 1 and 2 illustrate apertures 321 as a plain non-threaded apertures for passing fastener 41 therethrough. Aperture 321 is also shown to have a tapered shape such that a fastener head 42 is either recessed into aperture 321 or flash with the outer surface 322 of second magnet-holding member 32. The engagement between fastener 41 and first magnet-holding member 31 is through a threaded aperture 315 in first magnet-holding member 31 such that fastener head 42 pulls second magnet-holding member 32 toward first magnet-holding member 31 with tightening of fastener 41 in threaded aperture 315.

FIGS. 1 and 2 show locking member 40 including two pairs of fasteners 41, one at each end of magnet-holding members 31 and 32 to hold magnet-mounting structure 30 together.

In a method for securing magnet 11 to level 10 first magnet-holding member 31 is inserted into bottom-wall opening 25 such that first side flange 310 extends along first sidewall 211 at inner surface 240 of bottom wall 24, as shown in FIG. 1. FIG. 3 shows that magnet 11 is placed in the level interior within magnet-receiving opening 33 of first magnet-holding member 31. As further seen in FIGS. 1 and 3, second magnet-holding member 32 is placed over magnet 11 such that second side flange 320 extends along second sidewall 212 at inner surface 240 of bottom-wall 24. It is best seen in FIG. 3 that first and second side flanges 310 and 320 are on opposite sides of magnet-mounting structure 30. Fasteners 41 mechanically secure magnet-holding members 31 and 32 together such that side flanges 310 and 320 are held inside level frame 20 thereby securing magnet 11 in position with respect to bottom-wall opening 25.

FIG. 3 further shows first magnet-holding member 31 positioned against magnet-holding edge 270 of frame inner-wall 27. Magnet mounting structure 30 is secured to level frame 20 by tightening fasteners 41 which pull magnet-holding members 31 and 32 together. FIGS. 1-3 shows fastener 41 as a threaded fastener. As illustrated in FIG. 1, fastener 41 is inserted through aperture 321 of second magnet-holding member 32 and engaged with threaded aperture 315 of first magnet-holding member 31. Fastener 41 is then tightened against second magnet-holding member 32 such that the magnet-holding members are pulled together. For secure engagement and parts alignment, locking member 40 includes four fasteners 41, one pair at each end of magnet-holding members 31 and 32.

While the principles of the invention have been shown and described in connection with specific embodiments, it is to be understood that such embodiments are by way of example and are not limiting.

The invention claimed is:

1. In a level including (a) an elongate hollow frame with two opposite sidewalls and top and bottom walls extending between the sidewalls, the bottom wall defining an opening into the frame interior, and (b) a magnet secured at the bottom-wall opening, the improvement comprising a magnet-mounting structure including:
    first and second magnet-holding members positioning the magnet with respect to the bottom-wall opening, the first magnet-holding member having a first side flange and the second magnet-holding member having a second side flange, each side flange being positioned to extend along one of the opposite sidewalls at an inner surface of the bottom wall; and
    a locking member pulling the magnet-holding members together such that the side flanges are locked inside the level frame along the opposite sidewalls,
thereby mechanically securing the magnet to the level frame.

2. The level of claim 1 wherein:
    the frame includes an inner-wall extending between the sidewalls substantially parallel thereto and terminating with a magnet-holding edge at the bottom-wall opening; and
    the first magnet-holding member is positioned against the magnet-holding edge of the frame inner-wall.

3. The level of claim 2 wherein the first magnet-holding member has top and bottom surfaces, the top surface having a notch receiving the magnet-holding edge of the frame inner wall, thereby retaining the magnet-mounting structure in substantially fixed side-to-side position.

4. The level of claim 3 wherein the notch is formed by a pair of protrusions extending from the top surface of the first magnet-holding member.

5. The level of claim 3 wherein the magnet-holding edge of the frame inner wall includes lateral edge portions adjoining the bottom wall, the lateral edge portions retaining the first magnet-holding members in substantially fixed lengthwise position.

6. The level of claim 2 wherein the first magnet-holding member defines a magnet-receiving opening configured to receive the magnet such that the magnet is positioned against the magnet-holding edge of the inner wall.

7. The level of claim 6 wherein the first magnet-holding member is positioned against the magnet-holding edges of the frame inner-wall.

8. The level of claim 1 wherein the locking member includes a fastener extending through an aperture in the second magnet-holding member and engaging the first magnet-holding member.

9. The level of claim 8 wherein the fastener is a threaded fastener in threaded engagement with the first magnet-holding member such that tightening of the fastener pulls the magnet-holding members together.

10. The level of claim 8 wherein the locking member includes a pair of the fasteners.

11. The level of claim 10 wherein the locking member includes two pairs of the fasteners, one at each end of the magnet-holding members.

12. A method for securing a magnet to a level which includes an elongate hollow frame with first and second opposite sidewalls and top and bottom walls extending between the sidewalls, the bottom wall defining an opening therethrough, the method comprising:
    providing a magnet-mounting structure which includes first and second magnet-holding members having respective first and second side flanges;
    inserting the first magnet-holding member into the bottom-wall opening such that the first side flange extends along the first sidewall at an inner surface of the bottom wall;
    positioning the magnet with respect to the first magnet-holding member;
    placing the second magnet-holding member over the magnet such that the second side flange extends along the second sidewall at the inner surface of the bottom wall, the first and second side flanges being on opposite sides of the magnet-mounting structure; and
    mechanically securing the magnet-holding members together such that the side flanges are held inside the level frame thereby securing the magnet in position with respect to the bottom-wall opening.

13. The method of claim 12 wherein:
the frame includes an inner-wall extending between the sidewalls substantially parallel thereto and terminating with a magnet-holding edge at the bottom-wall opening; and
in the inserting step the first magnet-holding member is positioned against the magnet-holding edge of the frame inner-wall.

14. The method of claim 13 wherein the first magnet-holding member has top and bottom surfaces, the top surface having a notch receiving the magnet-holding edge of the frame inner wall, thereby retaining the magnet-mounting structure in substantially fixed side-to-side position.

15. The method of claim 14 wherein the notch is formed by a pair of protrusions extending from the top surface of the first magnet-holding member.

16. The method of claim 12 wherein:
the magnet mounting structure includes a locking member having a fastener configured for extending through an aperture in the second magnet-holding member for engagement with the first magnet-holding member; and
the securing step is pulling the magnet-holding members together by tightening the fastener.

17. The method of claim 16 wherein:
the fastener is a threaded fastener for threaded engagement with the first magnet-holding member; and
the securing step includes:
inserting the fastener through an aperture of the second magnet-holding member;
engaging the fastener with the first magnet-holding member; and
tightening the fastener against the second magnet-holding member such that the magnet-holding members are pulled together.

18. The method of claim 17 wherein the locking member includes a pair of the fasteners.

19. The method of claim 18 wherein the locking member includes two pairs of the fasteners, one at each end of the magnet-holding members.

20. The method of claim 12 wherein:
the frame includes an inner-wall extending between the sidewalls substantially parallel thereto and terminating with a magnet-holding edge at the bottom-wall opening;
the first magnet-holding member is positioned against the magnet-holding edge of the frame inner-wall; and
the first magnet-holding member defines a magnet-receiving opening configured to receive the magnet such that the magnet is positioned against the magnet-holding edge of the inner-wall.

* * * * *